United States Patent
Hyde et al.

(10) Patent No.: US 9,520,748 B2
(45) Date of Patent: Dec. 13, 2016

(54) SYSTEMS AND METHODS FOR PROVIDING WIRELESS POWER TO A POWER-RECEIVING DEVICE, AND RELATED POWER-RECEIVING DEVICES

(71) Applicant: SEARETE LLC, Bellevue, WA (US)

(72) Inventors: Roderick A. Hyde, Redmond, WA (US); Jordin T. Kare, Seattle, WA (US); Clarence T. Tegreene, Mercer Island, WA (US); Lowell L. Wood, Jr., Bellevue, WA (US)

(73) Assignee: EL WHA LLC, Bellevue, WA (US)

( * ) Notice: Subject to any disclaimer, the term of this patent is extended or adjusted under 35 U.S.C. 154(b) by 744 days.

(21) Appl. No.: 13/864,463

(22) Filed: Apr. 17, 2013

(65) Prior Publication Data
US 2014/0312714 A1 Oct. 23, 2014

(51) Int. Cl.
| | | |
|---|---|---|
| *H02J 7/00* | (2006.01) | |
| *H02J 7/02* | (2016.01) | |
| *H02J 17/00* | (2006.01) | |
| *H02J 5/00* | (2016.01) | |

(52) U.S. Cl.
CPC ............... *H02J 17/00* (2013.01); *H02J 5/005* (2013.01); *H02J 7/025* (2013.01)

(58) Field of Classification Search
CPC ............ H02J 17/00; H02J 5/005; H02J 7/025; H02J 3/01; H01F 38/14; B60L 11/182; B60L 11/1829; B60L 11/1831; Y02T 90/122; H04B 5/0037
See application file for complete search history.

(56) References Cited

U.S. PATENT DOCUMENTS

| | | | | |
|---|---|---|---|---|
| 5,790,976 A | * | 8/1998 | Boll | ........................... B60L 3/12 180/65.8 |
| 7,068,991 B2 | | 6/2006 | Parise | |
| 7,443,057 B2 | | 10/2008 | Nunally | |
| 7,671,736 B2 | | 3/2010 | Iverson et al. | |
| 7,929,908 B2 | | 4/2011 | Tillotson | |

(Continued)

FOREIGN PATENT DOCUMENTS

| | | |
|---|---|---|
| JP | 2010-193657 A | 9/2010 |
| JP | 2011-094995 A | 5/2011 |

(Continued)

OTHER PUBLICATIONS

PCT International Search Report; International App. No. PCT/US2014/034294; Aug. 14, 2014; pp. 1-5.

*Primary Examiner* — Jung Kim
*Assistant Examiner* — Rafael Pacheco
(74) *Attorney, Agent, or Firm* — Dorsey & Whitney LLP

(57) ABSTRACT

In an embodiment, a wireless power distribution system is disclosed. The wireless power distribution system includes a routing module having at least one processor configured to determine a route for a power-receiving device to travel responsive to receiving input about one or more characteristics associated with the power-receiving device or one or more wireless power transmitters for delivering power to the power-receiving device. The wireless power distribution system further includes the one or more wireless power transmitters operably coupled to the routing module. The one or more wireless power transmitters are configured to wirelessly transmit the power to the device at one or more locations along the route.

56 Claims, 9 Drawing Sheets

(56) References Cited

U.S. PATENT DOCUMENTS

| | | | |
|---|---|---|---|
| 8,725,331 B2* | 5/2014 | Yoshida | B60L 11/1842 701/22 |
| 9,126,490 B2* | 9/2015 | Cook | B60L 11/1842 |
| 9,155,047 B2* | 10/2015 | You | H04W 52/0267 |
| 9,190,851 B2* | 11/2015 | Kim | H02J 7/00 |

FOREIGN PATENT DOCUMENTS

| | | |
|---|---|---|
| JP | 2011-205749 A | 10/2011 |
| JP | 2011-217462 A | 10/2011 |
| KR | 2010-0134843 A | 12/2010 |

\* cited by examiner

SYSTEMS AND METHODS FOR PROVIDING WIRELESS POWER TO A POWER-RECEIVING DEVICE, AND RELATED POWER-RECEIVING DEVICES

SUMMARY

Embodiments disclosed herein are directed to wireless power distribution systems including a routing module configured to determine a route for a power-receiving device to travel along responsive to receiving information about one or more characteristics associated with the power-receiving device or one or more wireless power transmitters for delivering power to the power-receiving device, methods of distributing wireless power, and related devices. In an embodiment, a wireless power distribution system is disclosed. The wireless power distribution system includes a routing module having at least one processor configured to determine a route for a power-receiving device to travel along responsive to receiving input about one or more characteristics associated with the power-receiving device or one or more wireless power transmitters for delivering power to the power-receiving device. The wireless power distribution system further includes the one or more wireless power transmitters operably coupled to the routing module. The one or more wireless power transmitters are configured to wirelessly transmit the power to the power-receiving device at one or more locations along the route.

In an embodiment, a wireless power distribution system is disclosed. The wireless power distribution system includes a power-receiving device, and a routing module including at least one processor configured to determine a route for the power-receiving device to travel along responsive to receiving input about one or more characteristics associated with the power-receiving device or one or more wireless power transmitters for delivering power to the power-receiving device.

In an embodiment, a power-receiving device is disclosed. The power-receiving device includes a wireless transmitter configured to send one or more signals encoding information about one or more characteristics of the power-receiving device to a remote routing module associated with a wireless power distribution system. The power-receiving device further includes a wireless receiver configured to receive one or more routing signals and wireless power from the wireless power distribution system. The one or more routing signals encode a route along which the power-receiving device can travel to receive wireless power from the wireless power distribution system. The power-receiving device further includes a power converter coupled to the wireless receiver and configured to convert the wireless power to electrical energy.

In an embodiment, a method of distributing wireless power is disclosed. The method includes wirelessly receiving data about a route along which a power-receiving device can travel to receive power wirelessly. The method further includes wirelessly sending a request for delivery of the power to one or more locations along the route that the power-receiving device is to travel. The method also includes responsive to the sending the request, wirelessly receiving at least a portion of the power at the power-receiving device at the one or more locations along the route.

In an embodiment, a method includes at a routing module, receiving input about one or more characteristics associated with a power-receiving device in need of power. The method further includes with at least one processor of the routing module, determining a route along which the power-receiving device can receive power wirelessly responsive to the receiving the input.

In an embodiment, a method includes sending information about one or more characteristics associated with a power-receiving device in need of power. The method further includes responsive to the sending the information, at the power-receiving device, receiving route information about a route along which the power-receiving device can receive the power wirelessly.

In an embodiment, a method includes with at least one processor of a routing module, determining a route along which a power-receiving device can receive power wirelessly based at least partially on one or more characteristics of at least one of a plurality of wireless power transmitters.

The foregoing is a summary and thus may contain simplifications, generalizations, inclusions, and/or omissions of detail; consequently, the reader will appreciate that the summary is illustrative only and is NOT intended to be in any way limiting. Other aspects, features, and advantages of the devices and/or processes and/or other living subject matter described herein will become apparent after reading the teachings set forth herein.

DETAILED DESCRIPTION

Figure 1:
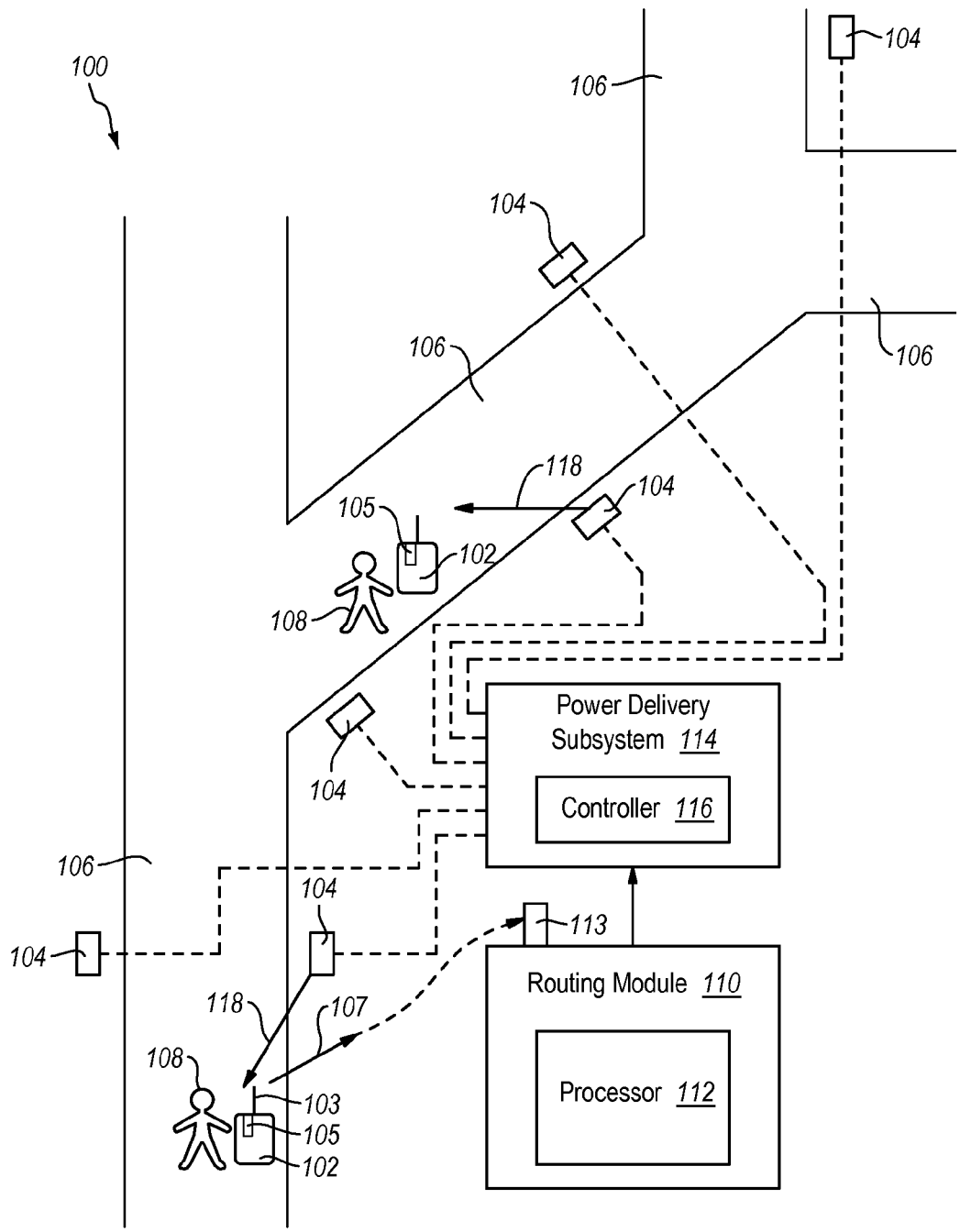
FIG. 1 is a schematic diagram of a wireless power distribution system for wirelessly powering a portable electronic device according to an embodiment.

Embodiments disclosed herein are directed to wireless power distribution systems including a routing module configured to determine a route for a power-receiving device to travel along responsive to receiving information about one or more characteristics associated with the power-receiving device or one or more wireless power transmitters for delivering power to the power-receiving device, methods of distributing wireless power, and related devices. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram of an embodiment of a wireless power distribution system 100 for wirelessly powering a portable electronic device 102 (e.g., a cell phone, a laptop computer, a personal data assistant, a tablet, or other power-receiving device). The wireless power distribution system 100 includes one or more wireless power transmitters 104 that are spaced from each other and distributed along one or more paths 106. The one or more wireless power transmitters 104 are each configured to wirelessly transmit power. For example, each of the wireless power transmitters 104 can include at least one of a laser configured to output a laser power beam, a microwave source configured to output microwave power, a microwave beam source configured to output a microwave power beam, an inductive power source configured to output inductive power, or a radio-frequency-power source configured to output radio-frequency power. The paths 106 can be any suitable path or paths on which a person 108 or vehicle can travel on, such as roads, streets, pedestrian pathways, walkways such as airport walkways, or other suitable paths.

The wireless power distribution system 100 further includes a routing module 110 that can be remote/separate from or integrated with the portable electronic device 102. The routing module 110 includes at least one processor 112 having processing electrical circuitry configured to determine a route along the one or more paths 106 for the portable electronic device 102 to travel along responsive to receiving input or other information about one or more characteristics associated with the portable electronic device 102 or the wireless power transmitters 104 for delivering power to the power-receiving device 102. The routing module 112 further includes a wireless transceiver 113 operably coupled to the processor 112, and configured to transmit the route to the portable electronic device 102 and receive data from another source such as the portable electronic device 102. For example, the wireless transceiver 103 of the portable electronic device 102 can communicate a request for wireless power to the routing module 110 along with information about the one or more characteristics about the portable electronic device 102. In other embodiments, the routing module 110 and the portable electronic device 102 can communicate via wired communications networks, via the Internet, by posting and accessing data in databases, or the like.

For example, the one or more characteristics associated with the portable electronic device 102 can include at least one of type of wireless power receiver or wireless transceiver 103 of the portable electronic device 102, amount of power requested by the portable electronic device 102, maximum power reception capability of the portable electronic device 102, cumulative energy requested by the portable electronic device 102, current location of the portable electronic device 102, speed at which the portable electronic device 102 is traveling, time at which the portable electronic device 102 is traveling, allowable periods for the portable electronic device 102 without power delivery, operating mode of the portable electronic device 102, or energy storage capacity of the portable electronic device 102. One or more of the characteristics associated with the portable electronic device 102 can involve a reference route that, for example, the user of the portable electronic device prefers to take. The routing module 110 can determine a revised route for the portable electronic device 102 that maximizes (or achieves specified values of) power or energy delivery while minimizing deviations from the reference route. One or more of the characteristics associated with the portable electronic device 102 can involve constraints on the route to be determined by the routing module 110, such as start or end locations, waypoints, trip duration, maximum allowable deviations from a reference route (in location, velocity, or time), or the like. One or more of the characteristics associated with the portable electronic device 102 can involve financial considerations, such as peak power prices or cumulative energy prices that the user is willing to pay for its delivered energy.

For example, the one or more characteristics associated with the wireless power transmitters 104 can include type of power that the wireless power transmitters 104 are configured to output, operational availability of the wireless power transmitters 104, frequency of the power that the wireless power transmitters 104 are configured to output, range that the wireless power transmitters 104 are configured to transmit power, directionality of the power that the wireless power transmitters 104 are configured to output, location of the wireless power transmitters 104, power level that can be transmitted from the wireless power transmitters 104, type of energy that can be transmitted from the wireless power transmitters 104, cost of the power that the wireless power transmitters 104 are configured to output, or some other operational information about the wireless power transmitters 104. For example, the one or more characteristics associated with the wireless power transmitters 104 can include operational availability, such as whether the wireless power transmitter 104 is out of service for maintenance, is reserved for use by another portable electronic device 102, or the like.

In use, the portable electronic device 102 can wireless transmit a request 107 for wireless power to the routing module 110 from the wireless transceiver 103 thereof, which is received by the wireless transceiver 113 of the routing module 110. In an embodiment, the request 107 can further include information about any of the one or more characteristics associated with the portable electronic device 102 disclosed herein. In making the request 107, the portable electronic device 102 can take into account the efficiency with which it can convert received power to useful energy (e.g., electrical energy storable in an onboard battery, or available to power an electrical device, a motor, or the like). For example, if the portable electronic device 102 needs 12 kilojoules, but only has a 60% conversion efficiency, the portable electronic device 102 can request 20 kilojoules of energy. Responsive to the request 107 and at least partially based on the one or more characteristics, the processor 112 of the routing module 110 can determine one or more specific routes for the person 108 to travel along carrying the portable electronic device 102 so that the portable electronic device 102 can reliably receive wireless power from one or more of the wireless power transmitters 104. The wireless transceiver 113 transmits the determined route(s) wirelessly to the wireless transceiver 103 of the portable electronic device 102, which can be visually displayed or audio delivered to the person 108 so that the person 108 can intentionally travel on the paths 106 along the route carrying the portable electronic device 102 to receive power wirelessly from one or more of the wireless power transmitters 104. For example, the route directs the person 108/portable electronic device 102 to a location to receive the power, directs the person 108/portable electronic device 102 to be at the location at a specified time to receive the power, directs the person 108/portable electronic device 102 to receive a selected amount of the power, or directs the manner in which the person 108/portable electronic device 102 travels between power draws from the wireless power transmitters 104. In an embodiment, the routing module 110 can receive requests 107 from multiple portable electronic devices 102. It can determine separate routes for each of the portable electronic devices 102, resolving conflicts associated with the desire to supply two or more portable electronic devices 102 with power from the same wireless power transmitter 104. Thus, in an embodiment, the routing module 110 can be configured to schedule or reserve power for delivery to the portable electronic device 102 at a later, selected time or time period. The routing module 110 can issue a verification of such a power reservation to the portable electronic device 102.

The wireless power distribution system 100 further includes a power delivery subsystem 114 operably coupled to the routing module 110 to receive the determined route information therefrom. The power delivery subsystem 114 further includes a controller 116 having control electrical circuitry that is operably coupled to each of the wireless power transmitters 104. The controller 116 is configured to selectively direct the wireless power transmitters 104 to output wireless power 118 with at least one of a direction or timing so that the portable electronic device 102 receives the wireless power 118 at a wireless transceiver 103 thereof as the person 108 travels along the route so determined carrying the portable electronic device 102. That is, given the determined route, the power delivery subsystem 114 selectively transmits wireless power 118 that is received by the wireless transceiver 103 of the portable electronic device 102 for immediate use or for energy storage in a battery or other energy storage device thereof. The wireless transceiver 103 can be coupled to a power converter 105, such as at least one of an optical-electrical converter, an antenna, a magnetic-electrical converter, or a radio-frequency-electrical converter depending on the type of wireless power 118 delivered that are configured to convert the received wireless power to electric energy associated with the received wireless power for powering the portable electronic device 102.

Figure 2:
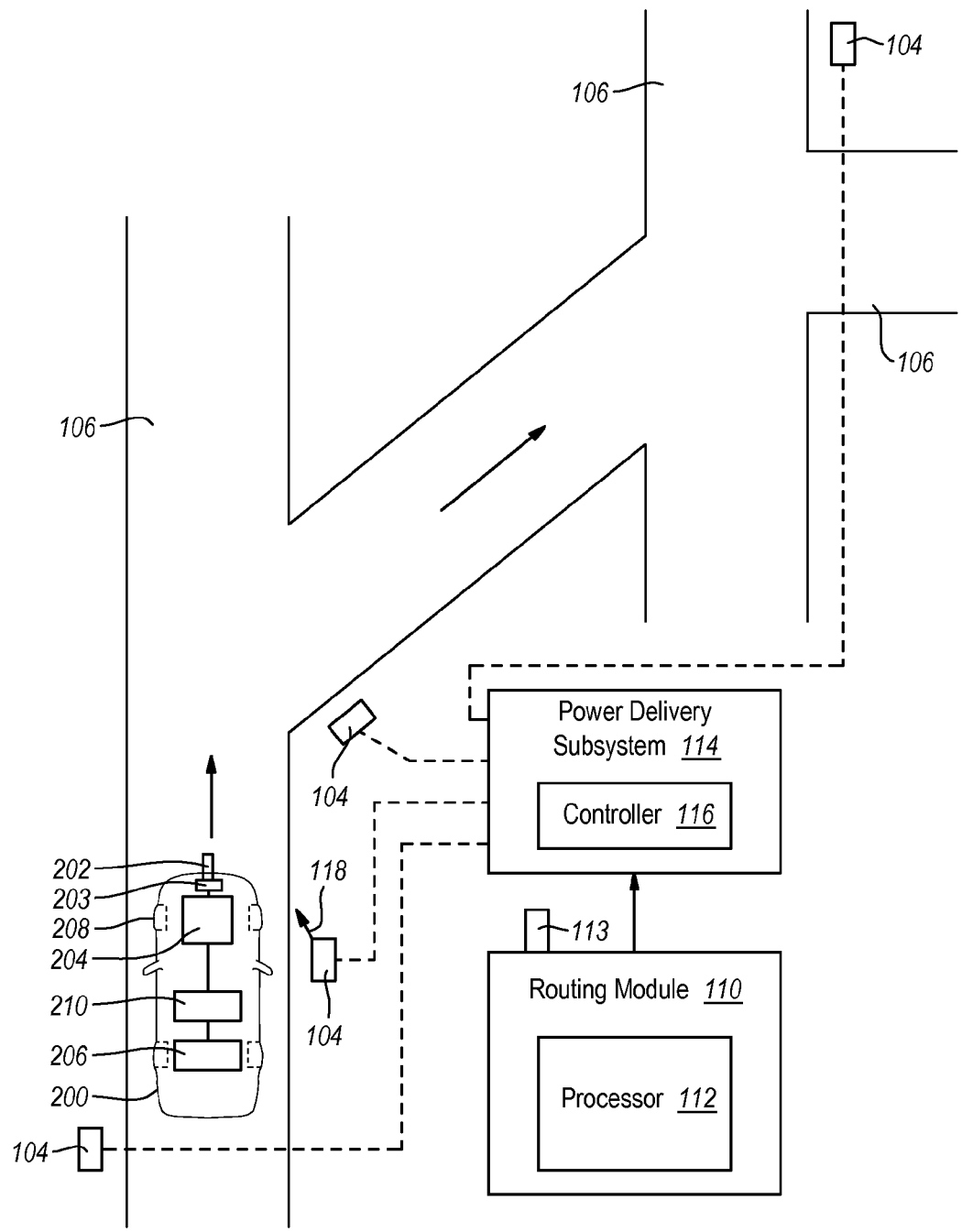
FIG. 2 is a schematic diagram of a wireless power distribution system for powering a vehicle according to an embodiment.

FIG. 2 is a schematic diagram of the wireless power distribution system 100 in which a vehicle 200 travels along a determined route to receive wireless power according to an embodiment. For example, the vehicle 200 can be an electric powered vehicle or a hybrid vehicle, such as a passenger vehicle, a commercial truck, or other vehicle. The vehicle 200 can include a wireless transceiver 202 operably coupled to a power converter 203 that converts the received wireless power to electrical energy for storage in an energy storage device 204 (e.g., a battery). The vehicle 200 further includes an electric or a hybrid motor 206 that powers a drive assembly (not labeled) that drives the wheels 208. A controller 210 is operably coupled to the energy storage device 204 and the motor 206, and includes control electrical circuitry configured to control delivery of electrical energy from the energy storage device 204 to the motor 206 for powering the motor 206 and causing movement of the vehicle 200.

In use, like the embodiment shown in FIG. 1, the routing module 110 determines a route for the vehicle 200 to travel along responsive to one or more characteristics of the vehicle 200 or the wireless power transmitters 104. After determining the route which can be responsive to a request for wireless power from the vehicle 200 via the wireless transceiver 202, the routing module 110 transmits the route to the vehicle 200 via communication between the wireless transceiver 113 of the routing module 110 and the wireless transceiver 202 on the vehicle 200. For example, the route can be displayed on a display screen for the driver of the vehicle 200 to view. For example, the route can be electronically transferred into an existing routing module of the vehicle or the driver. The vehicle 200 proceeds to travel along the route, while the power delivery subsystem 114 directs the wireless power transmitters 104 to transmit wireless power 118 to the vehicle 200 as it travels along the route. The wireless power 118 is received by the wireless transceiver 202 and converted to electrical energy by the power converter 203. The converted electrical energy can be stored in the energy storage device 204 that powers the motor 206 or delivered to the motor 206 for substantially immediate use.

Figure 3A:
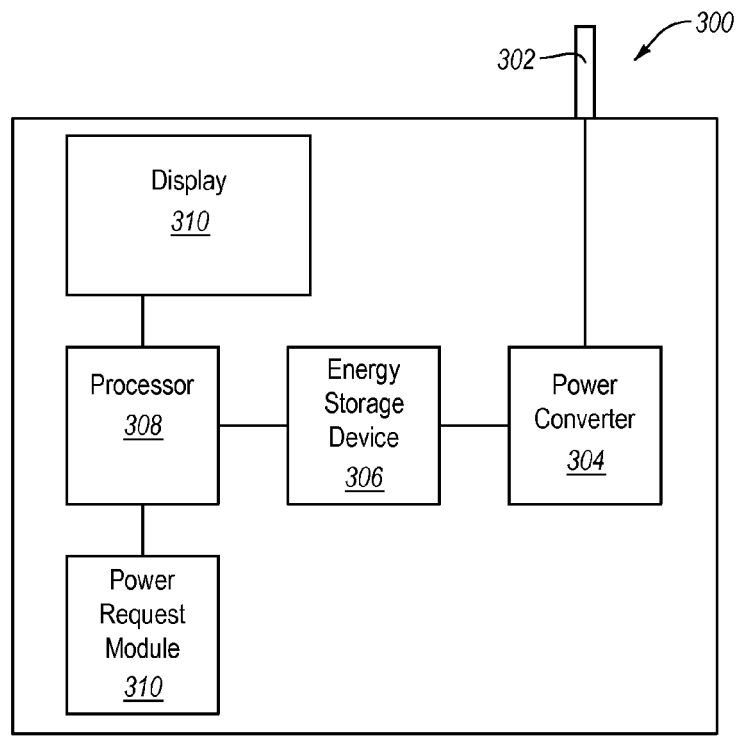
FIG. 3A is a block diagram of a portable electronic device according to an embodiment.

FIG. 3A is a block diagram of a portable electronic device 300 according to an embodiment. The portable electronic device 300 can be used for the portable electronic device 102 shown in FIG. 1. For example, the portable electronic device 300 can be embodied as a cell phone, a laptop computer, a personal data assistant, a tablet, or other power-receiving device. The portable electronic device 300 can include a wireless transceiver 302 that receives one or more data signals encoding information about a route for the person carrying the portable electronic device 300 to travel on. The wireless transceiver 302 is configured to transmit a request for wireless power to a routing module, such as the routing module 112 shown in FIG. 1. In an embodiment, the wireless transceiver 302 is also configured to transit one or more signals encoding information about one or more characteristics of the portable electronic device 300, such as any of the characteristics for a power-receiving device described above in relation to the embodiment shown in FIG. 1. In an embodiment, a separate wireless receiver and transmitter can be used instead of the wireless transceiver 302.

The portable electronic device 300 further includes a power converter 304 coupled to the wireless transceiver 302 that converts the received wireless power to electricity for storage in an energy storage device 306 (e.g., a battery). For example, the power converter 304 can include at least one of an optical-electrical converter, an antenna, a magnetic-electrical converter, or a radio-frequency-electrical converter depending on the type of wireless power to be received that is configured to convert the received wireless power to electrical energy. At least one processor 308 including processing electrical circuitry is provided that controls distribution of the stored energy from the energy storage device 306 for powering a visual display 310 (e.g., a touchscreen or other suitable display) and other aspects of the portable electronic device 300, such as cellular phone operation, etc. A power request module 310 including processing electrical circuitry is also operably coupled to the processor 308, and is configured to direct the wireless transceiver 302 to wirelessly transmit a request for power to the routing module, as previously discussed.

Figure 3B:
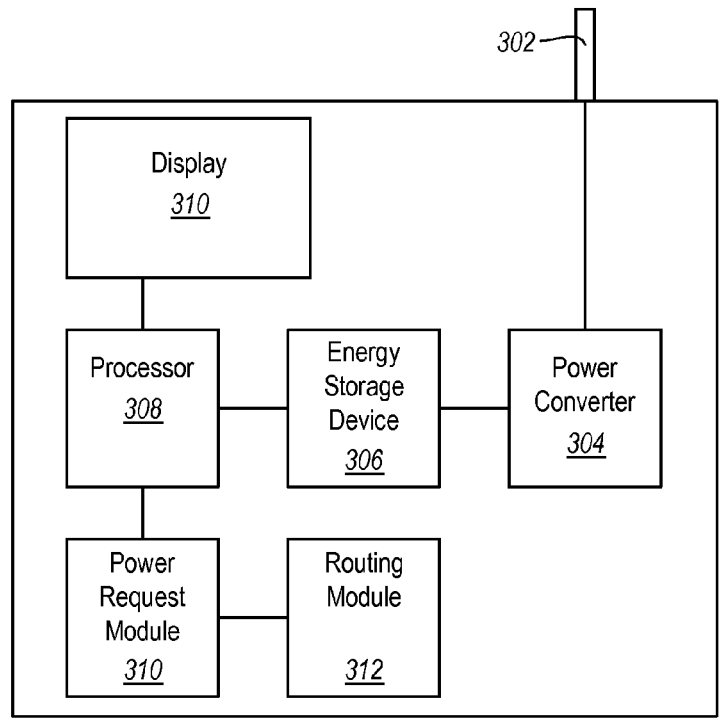
FIG. 3B is a block diagram of a portable electronic device including an integrated routing module according to an embodiment.

In an embodiment shown in FIG. 3B, a routing module 312 that performs the same or similar function as the routing module 110 can be integrated with the portable electronic device 300. In such an embodiment, the routing module 312 can be operably coupled to the processor 308 and direct the wireless transceiver 302 to direct a remote power deliver subsystem (e.g., the power delivery subsystem 114) to direct the wireless power transmitters 104 to selectively transmit power to the portable electronic device 300 as it travels along the determined path.

FIGS. 4-9 are flow diagrams of methods of wirelessly distributing power to a power-receiving device according to various embodiments. Any of the methods disclosed herein can be implemented by the wireless power distribution system 100 in conjunction with the portable electronic device 102, vehicle 200, portable electronic device 300, or another suitable power-receiving device.

Figure 4:
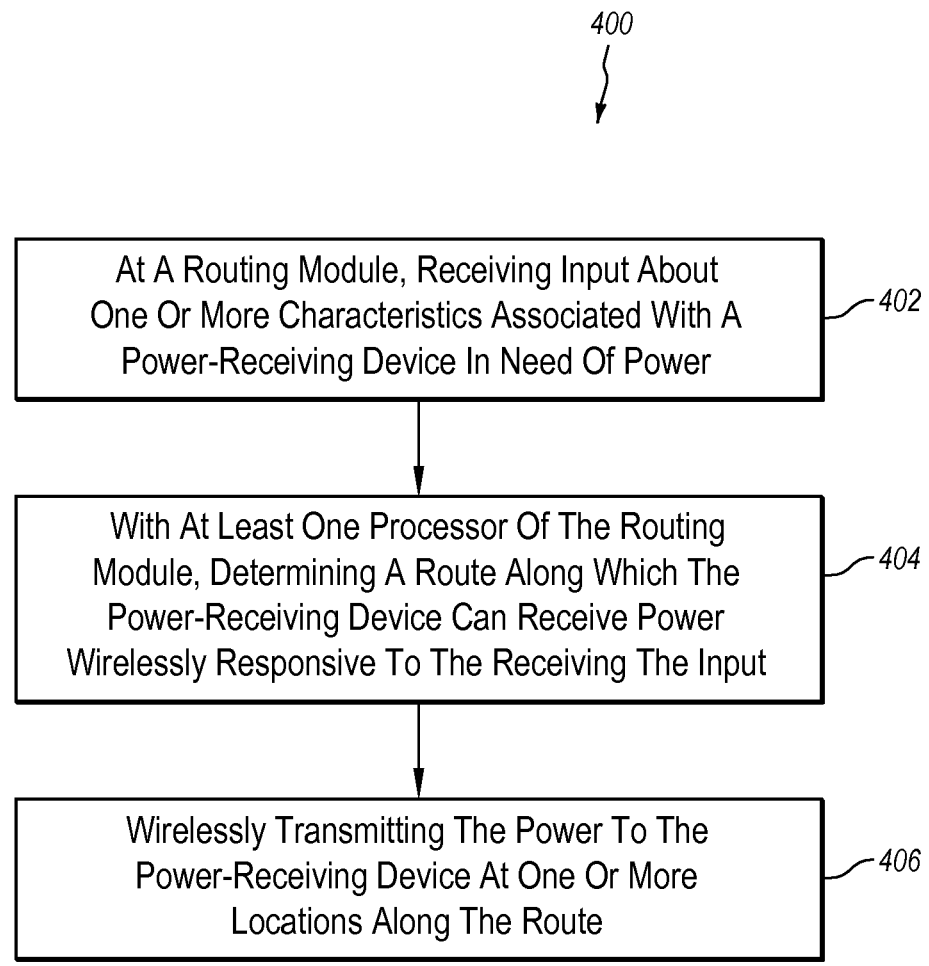
FIGS. 4-6 are flow diagram of methods of wirelessly distributing power to a power-receiving device according to various embodiments.

FIG. 4 is a flow diagram of a method 400 of wirelessly distributing power to a power-receiving device according to an embodiment. In act 402, at a routing module (e.g., routing module 110), input or other information is received about one or more characteristics associated with a power-receiving device (e.g., portable electronic device 102) in need of power. For example, the one or more characteristics can be any of the characteristics described herein about the portable electronic device 102. In act 404, with at least one processor of the routing module (e.g., processor 112), a route is determined along which the power-receiving device can receive power wireless responsive to receiving the input. In act 406, the power can be wirelessly transmitted (or otherwise communicated) to the power-receiving device at one or more locations along the route from one or more of the wireless power transmitters 104.

For example, the power can be delivered to the power-receiving device prior to or while the power-receiving device travels along the route, or prior to or while the power-receiving device travels along a portion of the route in which the power-receiving device consumes power at greater than a specified power consumption rate. In an embodiment, the route is determined so that the power-receiving device receives maximum power prior to or while the device travels along a portion of the route in which the power-receiving device consumes power at greater than a specified power consumption rate. In an embodiment, relatively more power can be wirelessly transmitted to the power-receiving device along a portion of the route in which the power-receiving device consumes power at greater than an average power consumption rate, such as if the vehicle 200 is traveling uphill, etc. For example, for a given distribution of the wireless power transmitters 104, the route can be determined in order to maintain power distribution to the power-receiving device above a threshold or a maximum power level, determined to maximize power distribution to the power-receiving device, or determined to minimize total cost for distributing power to the power-receiving device.

Figure 5:
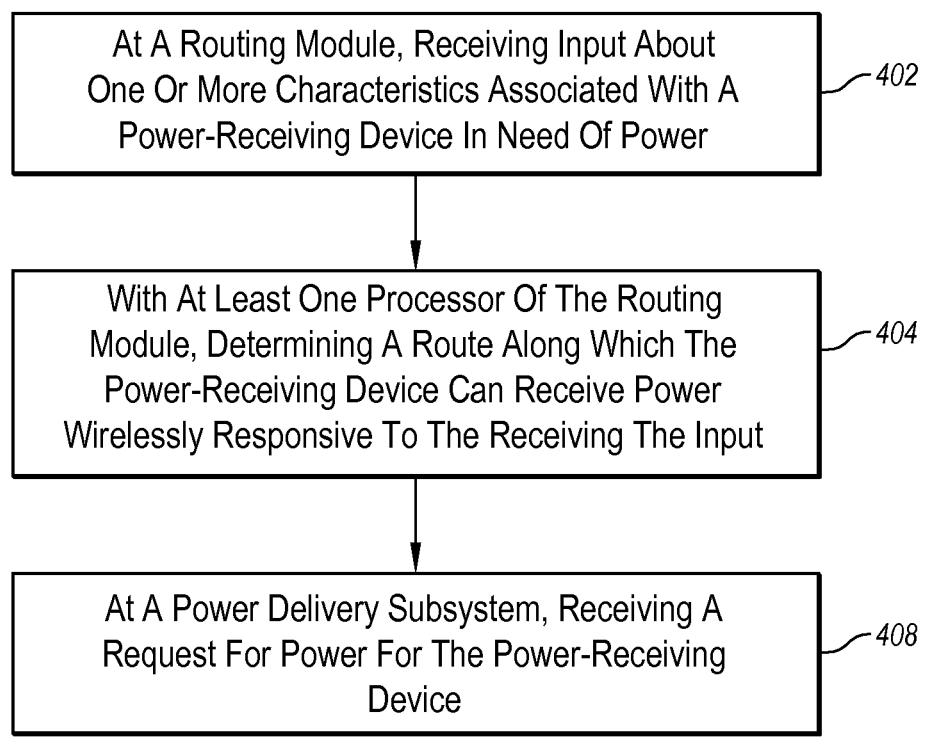
Figure 6:
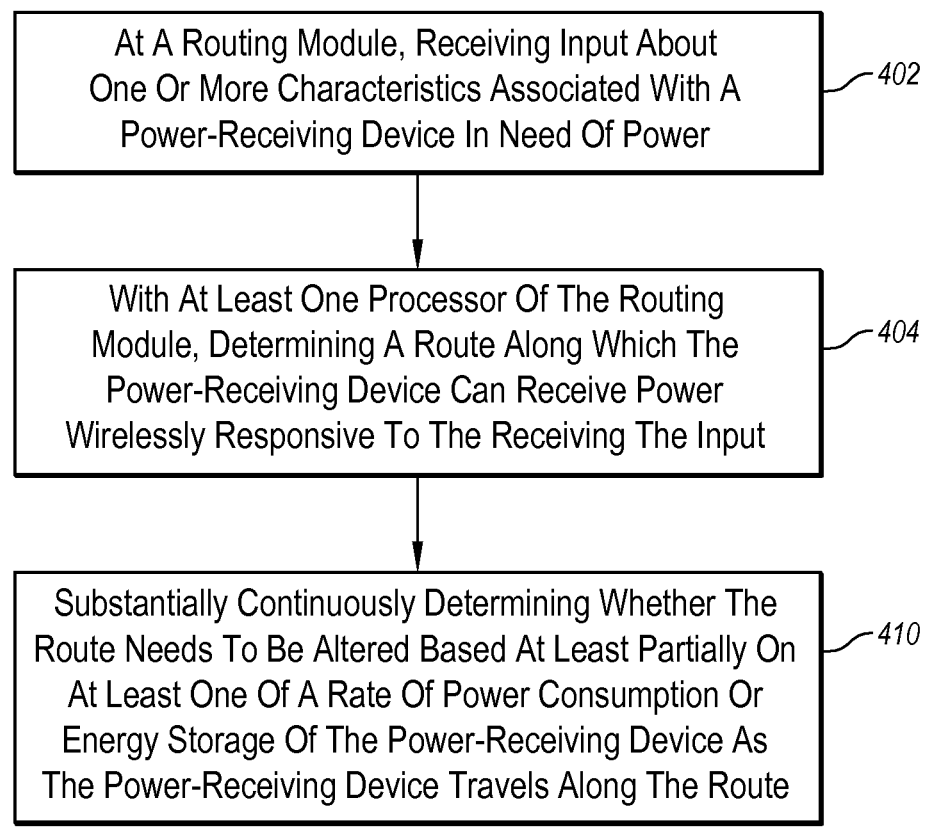

Referring to FIG. 5, in an embodiment, in act 408, at the power delivery subsystem (e.g., power delivery subsystem 114), a request for power can be received from, for example, the power-receiving device. Referring to FIG. 6, in an embodiment, after acts 406 or 408, at the routing module 110, in act 410, the route can be substantially continuously determined whether the route needs to be altered at least partially based on one or more factors, such as at least partially based on at least one of a rate of power consumption by the power-receiving device or rate at which energy storage in the power-receiving device is consumed as the power-receiving device travels along the route. For example, an altered route can be determined based at least partially on at least one of a rate of power consumption or energy storage of the power-receiving device as the power-receiving device travels along the route.

Figure 7:
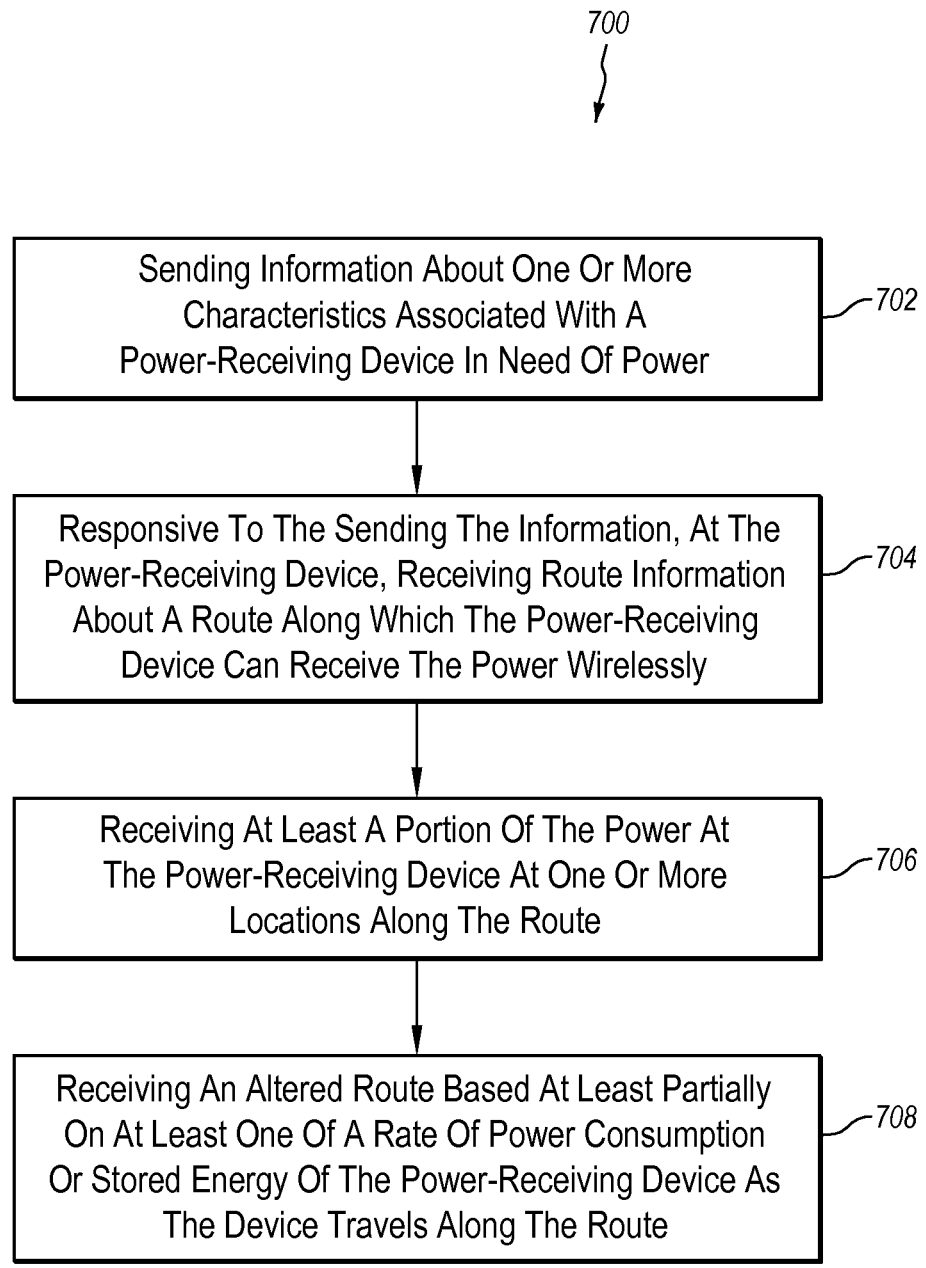
FIG. 7 is flow diagram of a method of wirelessly distributing power to a power-receiving device according to an embodiment.

FIG. 7 is a flow diagram of a method 700 of wirelessly distributing power to a power-receiving device according to an embodiment. In act 702, information can be sent about one or more characteristics associated with a power-receiving device in need of power, such as the portable electronic device 102. For example, the one or more characteristics can be any of the characteristics described herein about the portable electronic device 102. In act 704, responsive to sending the information in act 702, at the power-receiving device, route information can be received about a route along which the person or vehicle carrying the power-receiving device can travel along which the power-receiving device can receive power wirelessly. In an embodiment, the route can include a plurality of different routes, and the user of the power-receiving device can select one of the different routes, such as via a user interface in the power-receiving device, vehicle display, etc. In act 706, the power-receiving device can receive at least a portion of the power wirelessly at one or more locations along the route. In an embodiment, in act 708, the power-receiving device can receive an altered route at least partially based on a rate of power consumption by the power-receiving device or rate at which energy storage in the power-receiving device is consumed as the power-receiving device travels along the route.

Figure 8:
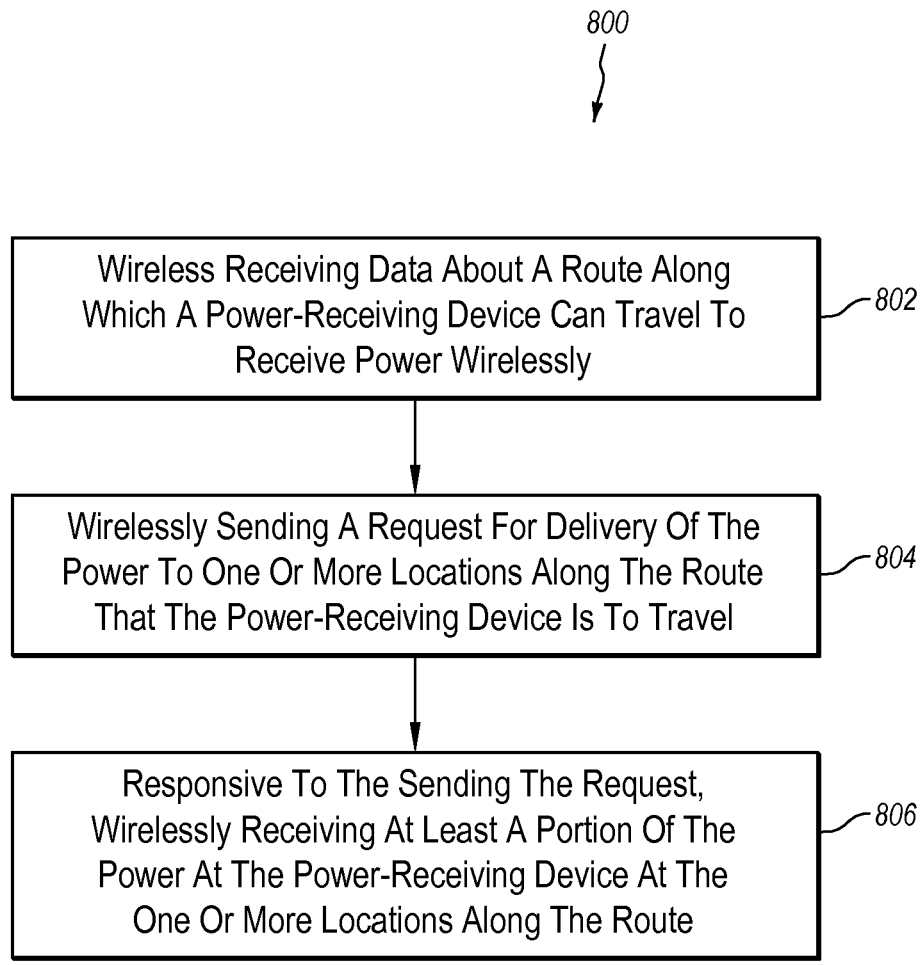
FIG. 8 is flow diagram of a method of wirelessly distributing power to a power-receiving device according to an embodiment.

FIG. 8 is a flow diagram of a method 800 of wirelessly distributing power to a power-receiving device according to an embodiment. In act 802, a power-receiving device can wireless receive data about a route along which a power-receiving device can travel to receive power wirelessly. In act 804, a request for delivery of the power to one or more locations along the route that the power-receiving device is to travel can be wirelessly sent. In act 806, responsive to the sending the request in act 804, at least a portion of the power can be wirelessly received at the power-receiving device at the one or more locations along the route.

Figure 9:
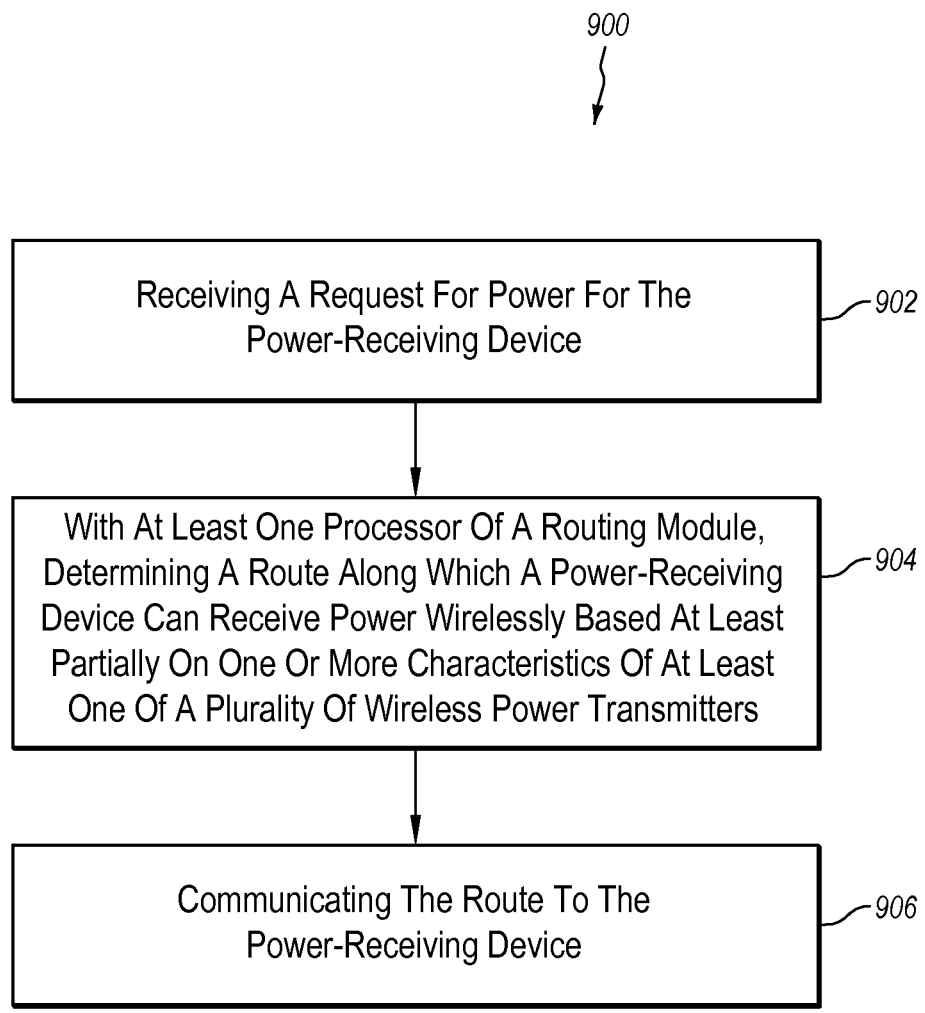
FIG. 9 is flow diagram of a method of determining a route for a power-receiving device to travel along for receiving wirelessly distributed power according to an embodiment.

FIG. 9 is a flow diagram of a method 900 related to wirelessly distributing power to a power-receiving device according to an embodiment. In act 902, a request for power for the power-receiving device can be received at, for example, the routing module 110. In act 904, with at least one processor of the routing module, a route along which the power-receiving device can receive power wirelessly based at least partially on one or more characteristics of at least one of a plurality of wireless power transmitters can be determined. In act 906, the route can be communicated to the power-receiving device.

In an embodiment, in act 904, the route can be determined in order to maximize power or energy distribution to the power-receiving device for a given distribution of a plurality of wireless power transmitters. In an embodiment, in act 904, the route can be determined in order to maintain power to the power-receiving device above a threshold power level. In an embodiment, in act 904, the route can be determined in order to minimize total cost for power or energy distribution to the power-receiving device.

The reader will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. The reader will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. The reader will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the reader will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Examples of electro-mechanical systems include but are not limited to a variety of consumer electronics systems, as well as other systems such as motorized transport systems, factory automation systems, security systems, and communication/computing systems. Electro-mechanical as used herein is not necessarily limited to a system that has both electrical and mechanical actuation except as context may dictate otherwise.

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein may be implemented in an analog or digital fashion or some combination thereof.

The herein described components (e.g., steps), devices, and objects and the discussion accompanying them are used as examples for the sake of conceptual clarity. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." The reader will recognize that "configured to" can generally encompass active-state components and/or inactive-state components and/or standby-state components, etc. unless context requires otherwise.

In some instances, one or more components may be referred to herein as "configured to." The reader will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, the recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, the various aspects and embodiments disclosed herein are for purposes of illustration and are not intended to be limiting, with the true scope and spirit being indicated by the following claims.

What is claimed is:

1. A wireless power distribution system, comprising:
    a routing module including at least one processor configured to determine a route for a power-receiving device to travel along responsive to receiving input about one or more characteristics associated with the power-receiving device or one or more wireless power transmitters for delivering power to the power-receiving device, the routing module configured to direct the one or more wireless power transmitters to selectively transmit power to the power receiving device as the power-receiving device travels along the route; and
    the one or more wireless power transmitters operably coupled to the routing module, the one or more wireless power transmitters configured to wirelessly transmit the power to the power-receiving device at one or more locations along the route as the power-receiving device travels along the route and responsive to a request for power delivery from the power-receiving device.

2. The wireless power distribution system of claim 1, wherein the one or more wireless power transmitters include a plurality of wireless power transmitters spaced from each other at least partially along the route.

3. The wireless power distribution system of claim 1, wherein the one or more wireless power transmitters include at least one of a laser, a microwave source, a microwave beam source, an inductive power source, or a radio-frequency-power source.

4. The wireless power distribution system of claim 1, wherein at least one of the one or more wireless power transmitters is configured to deliver the power to the power-receiving device prior to or while the power-receiving device travels along a portion of the route in which the device consumes power at greater than a specified power consumption rate.

5. The wireless power distribution system of claim 1, further comprising a power delivery subsystem operably coupled to the one or more wireless power transmitters and the routing module, the power delivery subsystem including a controller configured to control delivery of the power from the one or more wireless power transmitters responsive to a request for power from the power-receiving device.

6. The wireless power distribution system of claim 5, wherein the routing module is configured to receive operational information about the one or more wireless power transmitters from the power delivery subsystem and determine the route at least partially based on the operational information.

7. The wireless power distribution system of claim 5, further comprising a power request module associated with the power-receiving device, the power request module configured to send a request for wireless power for the power-receiving device to the power delivery subsystem.

8. The wireless power distribution system of claim 1, wherein the at least one processor of the routing module is configured to determine the route so that the power-receiving device receives maximum power when traveling along the route for a given distribution of the one or more wireless power transmitters.

9. The wireless power distribution system of claim 1, wherein the at least one processor of the routing module is configured to determine an altered route based at least partially on at least one of a rate of power consumption or energy storage of the power-receiving device as the power-receiving device travels along the route.

10. The wireless power distribution system of claim 1, wherein the routing module is separate from the power-receiving device.

11. The wireless power distribution system of claim 1, wherein the power-receiving device is integrated with a vehicle.

12. The wireless power distribution system of claim 1, wherein the power-receiving device includes a portable electronic device.

13. The wireless power distribution system of claim 1, wherein the one or more characteristics associated with the power-receiving device include at least one of type of power receiver of the power-receiving device, amount of power requested by the power-receiving device, maximum power reception capability of the power-receiving device, cumulative energy requested by the power-receiving device, location of the power-receiving device, speed at which the power-receiving device is traveling, or time at which the power-receiving device is traveling.

14. The wireless power distribution system of claim 1, wherein the one or more characteristics include peak or cumulative prices at which a user is willing to pay for the power.

15. The wireless power distribution system of claim 1, wherein the at least one processor of the routing module is configured to determine the route based at least partially on one or more characteristics of the one or more wireless power transmitters.

16. The wireless power distribution system of claim 15, wherein the one or more characteristics include type of power that the one or more wireless power transmitters are configured to output, frequency of the power that the one or more wireless power transmitters are configured to output, range that the one or more wireless power transmitters are configured to transmit power, directionality of the power that the one or more wireless power transmitters are configured to output, location of the one or more wireless power transmitters, power level that can be transmitted from the one or more wireless power transmitters, type of energy that can be transmitted from the one or more wireless power transmitters, or cost of the power that the one or more wireless power transmitters are configured to output.

17. A method, comprising:
at a routing module, receiving input about one or more characteristics associated with a power-receiving device in need of power;
with at least one processor of the routing module, determining a route along which the power-receiving device can receive power wirelessly responsive to the receiving the input; and
with at least one power delivery subsystem operably coupled to the routing module, selectively directing one or more wireless power transmitters to,
provide power to the power-receiving device responsive to a signal from the power delivery subsystem; and
output the power with at least one of a timing or a direction effective to provide the power while the power-receiving device moves along the route.

18. The method of claim 17, wherein the power-receiving device includes a power receiver configured to convert at least a portion of the power transmitted by the one or more wireless power transmitters to electricity for powering the power-receiving device.

19. The method of claim 17, wherein determining a route along which the power-receiving device can receive power wirelessly responsive to the receiving the input includes determining the route in order to maximize energy distribution to the power-receiving device for a given distribution of a plurality of wireless power transmitters.

20. The method of claim 17, wherein determining a route along which the power-receiving device can receive power wirelessly responsive to the receiving the input includes determining the route at least partially based on minimizing deviation from a nominal route while a specified amount of the power is delivered.

21. The method of claim 17, wherein determining a route along which the power-receiving device can receive power wirelessly responsive to the receiving the input includes determining the route in order to maintain power distribution to the power-receiving device above a threshold power level.

22. The method of claim 17, wherein determining a route along which the power-receiving device can receive power wirelessly responsive to the receiving the input includes determining the route in order to minimize total cost for power distribution to the power-receiving device.

23. The method of claim 17, wherein the one or more characteristics associated with the power-receiving device include at least one of type of power receiver of the power-receiving device, amount of power requested by the power-receiving device, maximum power reception capability of the power-receiving device, cumulative energy requested by the power-receiving device, location of the power-receiving device, speed at which the power-receiving device is traveling, or time at which the power-receiving device is traveling.

24. The method of claim 17, wherein the one or more characteristics associated with the power-receiving device include at least one of allowable periods for the power-receiving device without power delivery, operating mode of the power-receiving device, or energy storage capacity of the power-receiving device.

25. The method of claim 17, wherein determining a route along which the power-receiving device can receive power wirelessly responsive to the receiving the input includes determining the route at least partially based on one or more characteristics of a plurality of wireless power transmitters of the one or more wireless power transmitters from which the power is to be transmitted.

26. The method of claim 25, wherein the one or more characteristics of the plurality of wireless power transmitters include type of power that at least one of the plurality of wireless power transmitters is configured to output, frequency of the power that at least one of the plurality of wireless power transmitters is configured to output, range that at least one of the plurality of wireless power transmitters is configured to transmit power, directionality of the power that at least one of the plurality of wireless power transmitters is configured to output, or location of the plurality of wireless power transmitters, power level that can be transmitted from the plurality of wireless power transmitters, type of energy that can be transmitted from the plurality of wireless power transmitters, cost of power that the at least one of the plurality of wireless power transmitters is configured to output.

27. The method of claim 17, further comprising, at the power delivery subsystem, receiving a request for power for the power-receiving device.

28. The method of claim 17, further comprising sending information to the routing module about one or more characteristics of a plurality of wireless power transmitters from which the power is to be transmitted.

29. The method of claim 17, wherein the power-receiving device is integrated with a vehicle.

30. The method of claim 17, wherein the power-receiving device is included within a portable electronic device.

31. The method of claim 17, further comprising wirelessly transmitting the power to the power-receiving device at one or more locations along the route.

32. The method of claim 31, wherein wirelessly transmitting power to the power-receiving device at one or more locations along the route includes wirelessly transmitting relatively more power along a portion of the route in which the power-receiving device consumes power at greater than an average power consumption rate.

33. The method of claim 17, wherein the route directs the power-receiving device to a location to receive the power, directs the power-receiving device to a location to receive the power along the route at a selected time, or directs the power-receiving device to receive a specified amount of the power.

34. A method, comprising:
sending information about one or more characteristics associated with a power-receiving device in need of power;
responsive to the sending the information, at the power-receiving device, receiving route information about a route along which the power-receiving device can receive the power wirelessly; and
receiving wirelessly provided power from one or more wireless power transmitters while the power-receiving device is traveling along the route, the wirelessly provided power selectively provided based at least partially upon a request for power from the power-receiving device.

35. The method of claim 34, further comprising powering the power-receiving device with energy associated with the received power.

36. The method of claim 34, wherein the one or more characteristics associated with the power-receiving device include type of power receiver of the power-receiving device, amount of power requested by the power-receiving device, maximum power reception capability of the power-receiving device, cumulative energy requested by the power-receiving device, location of the power-receiving device, speed at which the power-receiving device is traveling, time at which the power-receiving device is traveling, allowable periods without power delivery for the power-receiving device, or operating mode of the power-receiving device.

37. The method of claim 34, further comprising receiving at least a portion of the power at the power-receiving device at one or more locations along the route.

38. The method of claim 37, wherein receiving at least a portion of the power at the power-receiving device at one or more locations along the route includes receiving a maximized energy distribution at the power-receiving device for a given distribution of a plurality of wireless power transmitters from which the power is to be transmitted.

39. The method of claim 37, wherein receiving at least a portion of the power at the power-receiving device at one or more locations along the route includes receiving a selected amount power at the power-receiving device when the power-receiving device consumes power at greater than a specified power consumption rate.

40. The method of claim 39, wherein the route is at least partially based on one or more characteristics of one or more wireless power transmitters from which the power is to be transmitted and the one or more characteristics of the one or more wireless power transmitters include type of power that one or more wireless power transmitters are configured to output, frequency of the power that the one or more wireless power transmitters are configured to output, range that the one or more wireless power transmitters are configured to transmit power, directionality of the power that the one or more wireless power transmitters are configured to output, or location of the one or more wireless power transmitters, power level that can be transmitted from the one or more wireless power transmitters, type of energy that can be transmitted from the one or more wireless power transmitters, cost of power that the one or more wireless power transmitters are configured to output.

41. The method of claim 39, wherein the route is at least partially based on one or more characteristics of one or more wireless power transmitters from which the power is to be transmitted and the one or more characteristics of the one or more wireless power transmitters include type of power that the one or more wireless power transmitters is configured to output, frequency of the power that the one or more wireless power transmitters are configured to output, range that the one or more wireless power transmitters are configured to transmit power, directionality of the power that the one or more wireless power transmitters are configured to output, or cost of power that the one or more wireless power transmitters are configured to output.

42. The method of claim 34, wherein the route directs the power-receiving device to travel to a location to receive the power.

43. The method of claim 34, wherein the route directs the power-receiving device to travel to a location to receive the power at a selected time.

44. The method of claim 34, wherein the route directs the manner in which the power-receiving device travels between power draws.

45. A method of distributing wireless power, comprising:
wirelessly receiving data about a route along which a power-receiving device can travel to receive power wirelessly;
wirelessly sending a request for delivery of the power to one or more locations along the route that the power-receiving device is to travel; and
responsive to the sending the request, wirelessly receiving at least a portion of the power at the power-receiving device at the one or more locations along the route.

46. The method of claim 45, further comprising selecting the route from a plurality of different routes.

47. The method of claim 45, wherein the route is subject to constraints on at least one of start and end locations, on duration, on allowable deviation from a reference route.

48. The method of claim 45, wherein the one or more characteristics include peak or cumulative prices at which a user is willing to pay for the power.

49. The method of claim 45, wherein wireless receiving data about a route along which a power-receiving device can travel to receive power wirelessly includes displaying the route on the power-receiving device.

50. The method of claim 45, further comprising powering the power-receiving device with energy associated with the wirelessly received power.

51. The method of claim 45, further comprising prior to the receiving the route, sending information to a routing module that determines the route, wherein the information includes power-receiving device information about one or more characteristics associated with the power-receiving device or a plurality of wireless transmitters that can transmit power to the power-receiving device.

52. The method of claim 51, wherein the one or more characteristics associated with the power-receiving device include type of power receiver of the power-receiving device, amount of power requested by the power-receiving device, maximum power reception capability of the power-receiving device, cumulative energy requested by the power-receiving device, location of the power-receiving device, speed at which the power-receiving device is traveling, or operating mode of the power-receiving device.

53. The method of claim 51, wherein the one or more characteristics of the plurality of wireless power transmitters include type of power that the at least one of the plurality of wireless power transmitters is configured to output, frequency of the power that the at least one of the plurality of wireless power transmitters is configured to output, range that the at least one of the plurality of wireless power transmitters is configured to transmit power, directionality of the power that the at least one of the plurality of wireless power transmitters is configured to output, or cost of power that the at least one of the plurality of wireless power transmitters is configured to output.

54. The method of claim 45, wherein the power-receiving device includes a portable electronic device.

55. The method of claim 45, wherein wirelessly receiving at least a portion of the power at the power-receiving device at the one or more locations along the route includes wirelessly receiving relatively more power along a portion of the route in which the power-receiving device consumes power at greater than an average power consumption rate.

56. A method, comprising:
with at least one processor of a routing module, determining a route along which a power-receiving device can receive power wirelessly based at least partially on one or more characteristics of at least one of a plurality of wireless power transmitters; and
responsive to the one or more characteristics, with a controller, selectively directing the at least one of a plurality of wireless transmitters to supply power to the power-receiving device with one or more of a direction or a timing effective to provide power to the power-receiving device while the power-receiving device moves along the route.

\* \* \* \* \*